United States Patent
Won et al.

(10) Patent No.: US 12,355,084 B2
(45) Date of Patent: Jul. 8, 2025

(54) NEGATIVE ACTIVE MATERIAL AND RECHARGEABLE LITHIUM BATTERY INCLUDING SAME

(71) Applicant: SAMSUNG SDI CO., LTD., Yongin-si (KR)

(72) Inventors: Jongmin Won, Yongin-si (KR); Jaehou Nah, Yongin-si (KR); Youngugk Kim, Yongin-si (KR); Changsu Shin, Yongin-si (KR); Sunil Park, Yongin-si (KR); Young-Min Kim, Yongin-si (KR); Eunji Kang, Yongin-si (KR); Doori Oh, Yongin-si (KR); Yookyung Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 18/384,494

(22) Filed: Oct. 27, 2023

(65) Prior Publication Data
US 2024/0356041 A1    Oct. 24, 2024

(30) Foreign Application Priority Data

Apr. 20, 2023   (KR) ........................ 10-2023-0052137

(51) Int. Cl.
| | | |
|---|---|---|
| *H01M 10/0525* | (2010.01) | |
| *H01M 4/36* | (2006.01) | |
| *H01M 4/38* | (2006.01) | |
| *H01M 4/587* | (2010.01) | |
| *H01M 4/62* | (2006.01) | |
| *H01M 4/02* | (2006.01) | |

(52) U.S. Cl.
CPC ........... *H01M 4/628* (2013.01); *H01M 4/366* (2013.01); *H01M 4/386* (2013.01); *H01M 4/587* (2013.01); *H01M 10/0525* (2013.01); *H01M 2004/027* (2013.01)

(58) Field of Classification Search
CPC ...... H01M 4/628; H01M 4/366; H01M 4/386; H01M 4/587; H01M 10/0525; H01M 2004/027
See application file for complete search history.

(56) References Cited

U.S. PATENT DOCUMENTS

| | | | | |
|---|---|---|---|---|
| 12,148,925 | B2* | 11/2024 | Luo ....................... | H01M 4/386 |
| 2018/0269475 | A1* | 9/2018 | Oh ........................ | H01M 4/364 |
| 2018/0342757 | A1* | 11/2018 | Choi ..................... | H01M 4/386 |
| 2020/0099052 | A1 | 3/2020 | Choi et al. | |

(Continued)

FOREIGN PATENT DOCUMENTS

| | | | | |
|---|---|---|---|---|
| CN | 114373915 A | * | 4/2022 | ............ H01M 4/366 |
| KR | 10-0493960 B1 | | 6/2005 | |

(Continued)

OTHER PUBLICATIONS

Azadeh et al. "Synthesis of Si/MgO/Mg2SiO4 Composite from Rice Husk-Originated Nano-Silica." J. Ultrafine Grained and Nanostruct Mater, 2016; 49(2): 92-96. (Year: 2016).*

(Continued)

*Primary Examiner* — Michael L Dignan
(74) *Attorney, Agent, or Firm* — Lee IP Law, P.C.

(57) ABSTRACT

A negative active material, including a silicon-carbon composite including silicon and amorphous carbon, a metal oxide, and a metal silicate.

12 Claims, 1 Drawing Sheet

(56) References Cited

U.S. PATENT DOCUMENTS

| | | | |
|---|---|---|---|
| 2021/0226202 A1 | 7/2021 | Liang et al. | |
| 2022/0209228 A1* | 6/2022 | Oh | H01M 4/364 |
| 2023/0049476 A1* | 2/2023 | Lee | C04B 35/62645 |
| 2023/0369589 A1* | 11/2023 | Yin | H01M 4/485 |
| 2024/0063371 A1* | 2/2024 | Park | H01M 4/362 |

FOREIGN PATENT DOCUMENTS

| | | | | |
|---|---|---|---|---|
| KR | 2017090449 A * | 8/2017 | | C01B 33/021 |
| KR | 2017137000 A * | 12/2017 | | H01M 10/0525 |
| KR | 10-2020-0126344 A | 11/2020 | | |
| KR | 10-2227309 B1 | 3/2021 | | |
| KR | 10-2022-0070044 A | 5/2022 | | |
| KR | 2023025354 A * | 2/2023 | | C01B 33/113 |

OTHER PUBLICATIONS

Chen et al. "Si/MgO composite anodes for Li-ion batteries." Rare Metals, vol. 30, No. 2, Apr. 2011, p. 166 (Year: 2011).*

Han et al. "Homogenizing Silicon Domains in SiOx Anode during Cycling and Enhancing Battery Performance via Magnesium Doping." ACS Appl. Mater. Interfaces 2021, 13, 52202-52214 (Year: 2021).*

* cited by examiner

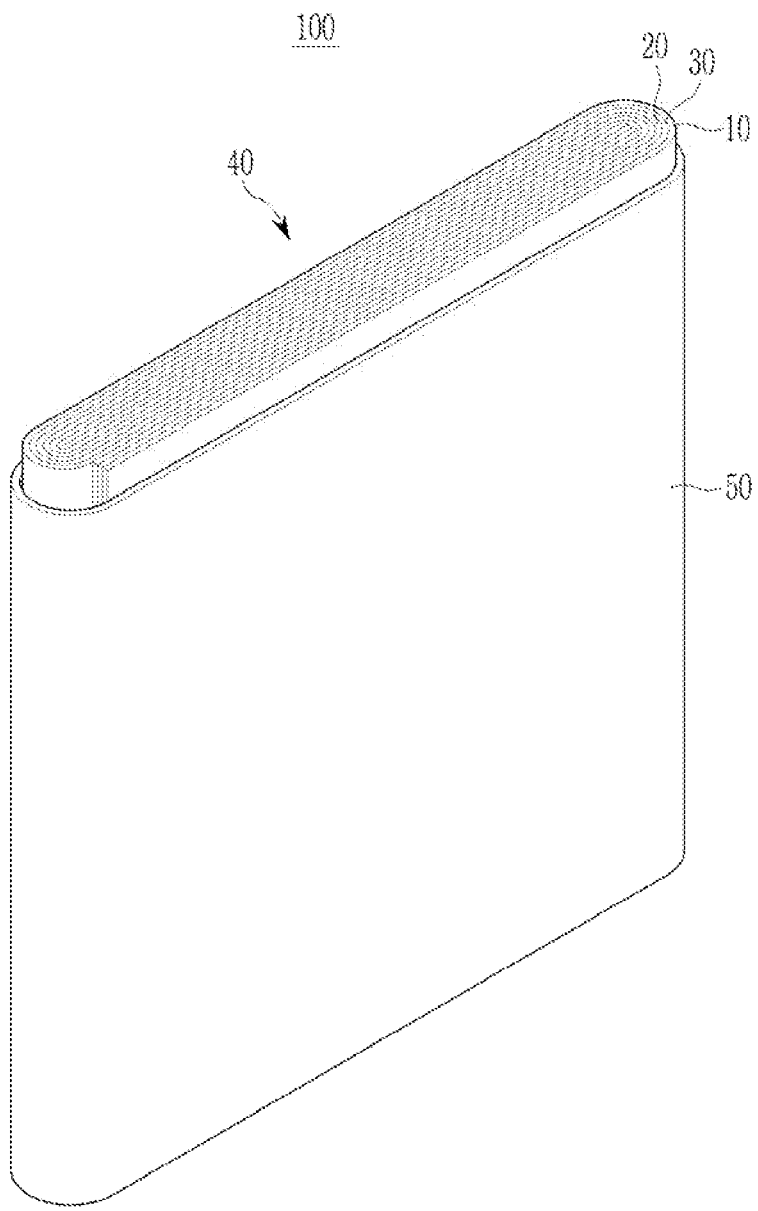

NEGATIVE ACTIVE MATERIAL AND RECHARGEABLE LITHIUM BATTERY INCLUDING SAME

CROSS-REFERENCE TO RELATED APPLICATION

This application claims priority to and the benefit of Korean Patent Application No. 10-2023-0052137, filed in the Korean Intellectual Property Office on Apr. 20, 2023, the entire contents of which are incorporated herein by reference.

BACKGROUND

1. Field

Embodiments relate to negative active materials and rechargeable lithium batteries including the same.

2. Description of the Related Art

Recently, with a rapid spread of electronic devices such as mobile phones, laptop computers, electric vehicles, and the like, a demand for small, lightweight, and relatively high-capacity rechargeable lithium batteries are rapidly increasing.

SUMMARY

Embodiments are directed to a negative active material, including a silicon-carbon composite including silicon and amorphous carbon, a metal oxide, and a metal silicate.

In embodiments, the metal oxide may be an oxide of Mg, Zn, Al, Fe, Ni, or a combination thereof.

In embodiments, the metal silicate may be a silicate of Mg, Zn, Al, Fe, Ni, or a combination thereof.

In embodiments, an amount of the metal oxide may be greater than an amount of the metal silicate.

In embodiments, the metal oxide may be an Mg oxide.

In embodiments, the metal silicate may be an Mg silicate.

In embodiments, an amount of the metal oxide may be about 0.21 wt % to about 14 wt % based on a total weight of the negative active material.

In embodiments, an amount of the metal oxide may be about 0.25 wt % to about 14 wt % based on a total weight of the negative active material.

In embodiments, an amount of the metal silicate may be about 0.01 wt % to about 10 wt % based on a total weight of the negative active material.

In embodiments, an amount of the metal silicate may be about 0.1 wt % to about 7 wt % based on a total weight of the negative active material.

In embodiments, the metal of the metal oxide and the metal silicate may be the same.

In embodiments, the amorphous carbon may be soft carbon or hard carbon, a mesophase pitch carbonized product, sintered cokes, or a combination thereof.

In embodiments, the silicon-carbon composite may include amorphous carbon coated on a surface of the silicon.

In embodiments, the silicon-carbon composite may further include crystalline carbon.

Embodiments are directed to a rechargeable lithium battery, including a negative electrode including the negative active material, a positive electrode, and an electrolyte.

BRIEF DESCRIPTION OF THE DRAWINGS

Features will become apparent to those of skill in the art by describing in detail exemplary embodiments with reference to the attached drawings in which:

the FIGURE is a schematic perspective view of a rechargeable lithium battery according to some example embodiments.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

As used herein, "a combination thereof" refers to a mixture, a laminate, a composite, a copolymer, an alloy, a blend, a reaction product, and the like of constituents.

Herein, it should be understood that terms such as "comprises," "includes," or "have" are intended to designate the presence of an embodied feature, number, step, element, or a combination thereof, but it does not preclude the possibility of the presence or addition of one or more other features, number, step, element, or a combination thereof.

In the drawings, the thickness of layers, films, panels, regions, etc., are exaggerated for clarity and like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In addition, "layer" herein includes not only a shape formed on the whole surface when viewed from a plan view, but also a shape formed on a partial surface.

Herein, "or" is not to be construed as an exclusive meaning, for example, "A or B" is construed to include A, B, A+B, and the like.

As used herein, when a definition is not otherwise provided, a particle diameter or size may be an average particle diameter. This average particle diameter means the average particle diameter (D50), which means a diameter (D50) of particles having a cumulative volume of 50 volume % in a particle size distribution. The average particle diameter may be measured by a method well known to those skilled in the art, for example, may be measured by a particle size analyzer, or may be measured by a transmission electron microscopic photograph or a scanning electron microscopic photograph. In some embodiments, it is possible to obtain an average particle diameter value by measuring it using a dynamic light-scattering method, performing data analysis, counting the number of particles for each particle size range, and calculating from this.

A negative active material according to some example embodiments may include a silicon-carbon composite including silicon and amorphous carbon; a metal oxide and a metal silicate.

The metal oxide may be an oxide of, e.g., Mg, Zn, Al, Fe, Ni, or a combination thereof. In addition, the metal silicate may be a silicate of, e.g., Mg, Zn, Al, Fe, Ni or a combination thereof.

The metal of the metal oxide and the metal silicate may be the same, and according to some example embodiments, the metal oxide may be an Mg oxide, and the metal silicate may be an Mg silicate. The Mg silicate may be $Mg_2SiO_4$, $MgSiO_3$, or a combination thereof.

The metal oxide and the metal silicate may be compounds stabilized by having no reactivity or an irreversible reaction with lithium within an operation voltage. Inclusion of the metal oxide and the metal silicate in a negative active material may allow that the negative active material be suppressed from the presence of silicon oxide generating irreversible capacity and thereby, from an increase in the irreversible capacity.

In some example embodiments, the metal oxide and the metal silicate may be located on the silicon-carbon composite surface or inside the silicon-carbon composite, but in another embodiment, the metal oxide and the metal silicate may be all located inside the silicon-carbon composite and on the surface.

In some example embodiments, an amount of the metal oxide included in the negative active material may be larger than that of the metal silicate. If the amount of the metal oxide is larger than that of the metal silicate, the irreversible capacity may be further effectively reduced without deteriorating charge and discharge capacity.

In some example embodiments, the amount of the metal oxide may be about 0.21 wt % to about 14 wt %, about 0.25 wt % to about 14 wt %, about 0.27 wt % to about 14 wt %, about 0.27 wt % to about 12.5 wt %, about 1.5 wt % to about 12.5 wt %, or about 6.8 wt % to about 12.5 wt % based on 100 wt % of the negative active material.

In addition, the amount of the metal silicate may be about 0.01 wt % to about 10 wt %, about 0.1 wt % to about 8 wt %, about 0.1 wt % to about 7 wt %, about 0.23 wt % to about 5 wt %, about 0.23 wt % to about 4.8 wt %, about 0.6 wt % to about 4.8 wt %, or about 2.6 wt % to about 4.8 wt % based on 100 wt % of the negative active material.

The amount of the metal oxide and the metal silicate may be measured in an ICP (Inductively coupled plasma) method and an XRD method. The ICP method may be used to obtain amounts of metal elements, and the XRD method may be used to obtain a metal oxide peak and a metal silicate peak. In addition, a height ratio of the metal oxide peak and the metal silicate peak may be calculated to obtain a weight ratio of the metal oxide and the metal silicate. Accordingly, the amounts of the metal elements measured in the ICP method and the ratio of the metal oxide and the metal silicate measured in the XRD method may be used to obtain each amount of the metal oxide and the metal silicate included in the negative active material.

The XRD method may use CuKα rays. The amount of the metal oxide and the metal silicate may be maintained after the formation charge and discharge.

In the silicon-carbon composite, silicon may be nano-silicon. In some example embodiments, the silicon may mean Si (elemental Si). If the silicon-carbon composite includes the silicon as a silicon oxide, the silicon oxide may react with lithium, generating irreversible capacity and thereby, deteriorating efficiency. In addition, because the generation of the irreversible capacity may reduce capacity, in order to increase the capacity, the silicon-carbon composite could be used in a relatively excessive amount in a negative electrode, which may inappropriately increase resistance and deteriorate rate capability.

A particle diameter of the silicon may be about 10 nm to about 1000 nm, and according to some example embodiments, it may be about 20 nm to about 150 nm. If the particle diameter of the silicon is included in the above range, excessive volume expansion occurring during charging and discharging may be suppressed, and disconnection of a conductive path due to particle crushing during charging and discharging may be prevented.

In the silicon-carbon composite, the amorphous carbon may be soft carbon or hard carbon, a mesophase pitch carbonized product, sintered cokes, or a combination thereof.

According to some example embodiments, the silicon-carbon composite may have amorphous carbon coated on a surface of silicon, and, e.g., the silicon-carbon composite may include silicon particles and amorphous carbon coated on the surface of the silicon particles. In another embodiment, the silicon-carbon composite may include secondary particles in which primary silicon particles may be agglomerated, and an amorphous carbon coating layer may be on the surface of the secondary particles. The amorphous carbon may also be disposed between the primary silicon particles, so that, e.g., the primary silicon particles may be coated with amorphous carbon. The silicon-carbon composite may include a core in which silicon particles may be dispersed in an amorphous carbon matrix and an amorphous carbon coating layer coating the surface of the core.

The secondary particles may be located in the center of the Si—C composite, which may be referred to as the core and a center portion. The amorphous carbon coating layer may be referred to as a shell or an outer portion.

In some example embodiments, the secondary particle or the core may further include crystalline carbon. If the silicon-carbon composite further includes crystalline carbon, the silicon-carbon composite may include secondary particles in which primary silicon particles and crystalline carbon are agglomerated, and an amorphous carbon coating layer on the surface of the secondary particles.

The crystalline carbon may include graphite such as unspecified-shaped, sheet-shaped, flake-shaped, spherical-shaped, or fibrous-shaped natural graphite or artificial graphite.

If the silicon-carbon composite further includes crystalline carbon, in preparing a negative electrode using the silicon-carbon composite, movement of lithium ions and electrons may become easier and resistance may be further reduced, so the effect of including the metal oxide and the metal silicate may be obtained even larger.

An amount of the silicon nanoparticles included in the silicon-carbon composite may be about 30 wt % to about 70 wt % based on 100 wt % of the negative active material layer, and an amount of the amorphous carbon may be about 30 wt % to about 70 wt % based on 100 wt % of the negative active material layer.

In some example embodiments, if the silicon-carbon composite further includes crystalline carbon, an amount of silicon nanoparticles included in the silicon-carbon composite may be about 20 wt % to about 70 wt % based on based on 100 wt % of the silicon-carbon composite, an amount of the amorphous carbon may be about 20 wt % to about 70 wt % based on 100 wt % of the silicon-carbon composite, and an amount of crystalline carbon may be about 1 wt % to about 20 wt % based on 100 wt % of the silicon-carbon composite. If coated with the amorphous carbon, a thickness of the coating layer of the amorphous carbon may be about 5 nm to about 100 nm.

A negative active material according to some example embodiments may be usefully used in some example embodiments.

The negative active material according to negative active material may be prepared through the following process.

Micrometer-sized silicon particles and an organic solvent may be mixed to prepare a silicon dispersion. At this time, by performing the mixing process as a milling process, the size of the silicon particles may be reduced from micrometers to nanometers to become nano-silicon. The milling process may be performed with a bead mill or a ball mill. In this process, silicon may naturally react with oxygen present in the air to form silicon oxide.

As the organic solvent, alcohols that do not oxidize the silicon particles and are easily volatilized may be appropriately used, and the alcohols may be, e.g., isopropyl alcohol, ethanol, methanol, butanol, propylene glycol, or a combination thereof.

A mixing ratio of the silicon particles and the organic solvent may be about 5:95 weight ratio to about 30:70 weight ratio, or about 10:90 weight ratio to about 25:75 weight ratio. If the mixing ratio of the silicon particles and the organic solvent is within the above range, milling efficiency may be further improved.

To the silicon dispersion, a metal raw material is added to prepare a mixed solution. The metal raw material may be metal-containing nitride, chloride, sulfide, or a combination thereof. In an implementation, the metal raw material may be, e.g., $Mg(NO_3)_2$, $MgCl_2$, $Mg_2SO_4$, or a combination thereof. An addition amount of the metal raw material may be adjusted to have a metal oxide amount of about 0.1 wt % to about 5 wt % and a metal silicate amount of about 0.1 wt % to about 5 wt % in the negative active material. The addition amount of the metal raw material may be appropriately adjusted according to types of a metal. In an implementation, if the metal is Mg, the silicon and Mg may be mixed in a weight ratio of about 99.2:0.8 to about 96.1:3.0, and if the metal is Zn, the silicon and Zn may be mixed in a weight ratio of about 98.5:1.5 to about 94.5:5.5.

The obtained mixed solution is spray-dried to prepare a Si precursor containing a metal salt (hereinafter, referred to as "Si precursor"). This spray drying process may be carried out at about 50° C. to about 200° C. In the Si precursor prepared according to this spray drying process, secondary particles may be formed by agglomerating primary particles of nano-silicon, and the metal raw material may be located on the surface of the primary particles and/or the secondary particles. The Si precursor may include silicon oxide. If the spray drying process is performed in the above temperature range, a process in which primary particles are agglomerated to form secondary particles may be more appropriately performed.

To the mixed solution, crystalline carbon may be further added and mixed as an additional process. An addition amount of the crystalline carbon may be adjusted to have a mixing weight ratio of silicon and crystalline carbon in a range of about 10:90 to about 95:5 or about 20:80 to about 90:10. If the mixing ratio of silicon and the crystalline carbon is within the ranges, electrical resistance may be advantageously maintained.

If the crystalline carbon is added to the mixed solution, the obtained Si precursor may be secondary particles in which the nano-silicon primary particles are agglomerated with the crystalline carbon. Herein, the metal raw material may also be agglomerated therewith. The Si precursor may include the silicon oxide.

The Si precursor and the amorphous carbon precursor may be mixed. A mixing ratio of the Si precursor and the amorphous carbon precursor may be in a weight ratio of about 80:20 to about 50:50, which is the amount including the metal raw material. If the mixing ratio of the Si precursor and the amorphous carbon precursor is within the above ranges, because the amorphous carbon is not excessively included in the final negative active material, a more appropriate silicon utilization rate may be obtained and excellent initial efficiency may be exhibited.

The amorphous carbon precursor may include coal-based pitch, meso-pitch, mesophase pitch, petroleum-based pitch, meso-carbon pitch, coal-based oil, petroleum-based heavy oil or a polymer resin such as a phenol resin, a furan resin, a polyimide resin, etc.

Then, the obtained mixture may be subjected to heat treatment to prepare a heat-treated product. The heat treatment process may be performed at about 700° C. to about 1100° C. for about 1 hour to about 5 hours. The heat treatment process may be performed under a $N_2$ atmosphere, an Ar atmosphere, or a combination thereof. If the atmosphere of the heat treatment process is included in the above conditions, it may be possible to effectively form amorphous carbon while suppressing the oxidation of silicon and the generation of SiC, thereby reducing the resistance of the active material. During the heat treatment process, the amorphous carbon precursor may be converted into amorphous carbon, so that the amorphous carbon may surround the secondary particle surface. The amorphous carbon may be present among the primary particles. During the heat treatment process, the silicon oxide in the mixture may be decomposed into silicon and oxygen, and this oxygen may react with a metal raw material to form a metal oxide, while also forming active silicon participating in a charge and discharge reaction of a battery. In one or more embodiments, some of the silicon may react with the metal raw material and thus form metal silicate.

Resultantly, because the silicon oxide may be removed from a final negative active material, the capacity deterioration may be prevented by irreversible reaction of the silicon oxide with lithium.

Some example embodiments provide a rechargeable lithium battery including a negative electrode, a positive electrode, and an electrolyte.

The negative electrode may include a current collector and a negative active material layer on the current collector and may include the negative active material according to some example embodiments.

The negative active material according to some example embodiments may be included as a first negative active material, and crystalline carbon may be included as a second negative active material. A mixing ratio of the first negative active material and the second negative active material may be in a weight ratio of about 1:99 to about 50:50. In some embodiments, the negative active material may include the first negative active material and the second negative active material in a weight ratio of about 5:95 to about 20:80.

In the negative active material layer, an amount of the negative active material may be about 95 wt % to about 98 wt % based on 100 wt % of the negative active material layer.

The negative active material layer may include a binder and may further include a conductive material. An amount of the binder may be about 1 wt % to about 5 wt % based on 100 wt % of the negative active material layer. An amount of the conductive material may be about 1 wt % to about 5 wt % based on 100 wt % of the negative active material layer.

The binder may serve to well attach the negative active material particles to each other and also to well attach the negative active material to the current collector. The binder may be a non-aqueous binder, an aqueous binder, or a combination thereof.

The non-aqueous binder may include an ethylene propylene copolymer, polyacrylonitrile, polystyrene, polyvinylchloride, carboxylated polyvinylchloride, polyvinyl fluoride, polyurethane, polytetrafluoroethylene, polyvinylidene fluoride, polyethylene, polypropylene, polyamideimide, polyimide, or a combination thereof.

The aqueous binder may include a styrene-butadiene rubber (SBR), an acrylated styrene-butadiene rubber (ABR), an acrylonitrile-butadiene rubber, an acrylic rubber, a butyl rubber, a fluoro rubber, an ethylene oxide-containing polymer, polyvinyl pyrrolidone, polypropylene, polyepicrohydrin, polyphosphazene, an ethylene propylene diene copolymer, polyvinylpyridine, chlorosulfonated polyethylene, latex, a polyester resin, an acrylic resin, a phenolic resin, an epoxy resin, polyvinyl alcohol, or a combination thereof.

If the aqueous binder is used as a negative electrode binder, a cellulose-based compound may be further used to provide viscosity as a thickener. The cellulose-based compound may include, e.g., carboxymethyl cellulose, hydroxypropylmethyl cellulose, methyl cellulose, or alkali metal salts thereof. The alkali metal may be Na, K, or Li. An amount of the thickener may be about 0.1 part by weight to about 3 parts by weight based on 100 parts by weight of the negative active material.

The conductive material may be used to impart conductivity to the electrode, and any material may be used as long as it does not cause chemical change in the battery to be configured and is an electron conductive material. In an implementation, the conductive material may include, e.g., a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include, e.g., a copper foil, a nickel foil, a stainless steel foil, a titanium foil, a nickel foam, a copper foam, a polymer substrate coated with a conductive metal, and a combination thereof.

The positive electrode may include a current collector and a positive active material layer formed on the current collector.

The positive active material may include lithiated intercalation compounds that reversibly intercalate and deintercalate lithium ions. In an implementation, one or more composite oxides of a metal, e.g., cobalt, manganese, nickel, and a combination thereof, and lithium may be used. In an implementation, a compound represented by any one of the following chemical formulas may be used. $Li_aA_{1-b}X_bD^1_2$ ($0.90 \leq a \leq 1.8$, $0 \leq b \leq 0.5$); $Li_aA_{1-b}X_bO_{2-c1}D^1_{c1}$ ($0.90 \leq a \leq 1.8$, $0 \leq b \leq 0.5$, $0 \leq c1 \leq 0.05$); $Li_aE_{1-b}X_bO_{2-c1}D^1_{c1}$ ($0.90 \leq a \leq 1.8$, $0 \leq b \leq 0.5$, $0 \leq c1 \leq 0.05$); $Li_aE_{2-b}X_bO_{4-c1}D^1_{c1}$ ($0.90 \leq a \leq 1.8$, $0 \leq b \leq 0.5$, $0 \leq c1 \leq 0.05$); $Li_aNi_{1-b-c}Co_bX_cD^1_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.5$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.5$, $0 < \alpha < 2$); $Li_aNi_{1-b-c}Mn_bX_cD^1_\alpha$ ($0.90 \leq a \leq 1.8$, $0 \leq b \leq 0.5$, $0 \leq c \leq 0.5$, $0 \leq \alpha \leq 2$); $Li_aNi_{1-b}Mn_bX_cO_{2-\alpha}T_\alpha$ ($0.90 \leq a \leq 1.8$, $0 \leq b \leq 0.5$, $0 \leq c \leq 0.5$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.5$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cL^1_dG_eO_2$ ($0.90 \leq a \leq 1.8$, $0 \leq b \leq 0.9$, $0 \leq c \leq 0.5$, $0 \leq d \leq 0.5$, $0 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4Li_{(3-f)}J_2(PO_4)_3$ ($0 \leq f \leq 2$); $Li_{(3-f)}Fe_2(PO_4)_3$ ($0 \leq f \leq 2$); and $Li_aFePO_4$ ($0.90 \leq a \leq 1.8$)

In the above chemical formulas, A may be Ni, Co, Mn, or a combination thereof; X may be Al, Ni, Co, Mn, Cr, Fe, Mg, Sr, V, a rare earth element, or a combination thereof; $D^1$ may be O, F, S, P, or a combination thereof; E may be Co, Mn, or a combination thereof; T may be F, S, P, or a combination thereof; G may be Al, Cr, Mn, Fe, Mg, La, Ce, Sr, V, or a combination thereof; Q may be Ti, Mo, Mn, or a combination thereof; Z may be Cr, V, Fe, Sc, Y, or a combination thereof; J may be V, Cr, Mn, Co, Ni, Cu, or a combination thereof, and $L^1$ may be Mn, Al, or a combination thereof.

The compounds may have a coating layer on the surface, or may be mixed with another compound having a coating layer. The coating layer may include, e.g., an oxide of a coating element, a hydroxide of a coating element, an oxyhydroxide of a coating element, an oxycarbonate of a coating element, or a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. In an implementation, the method may include any coating method (e.g., spray coating, dipping, etc.), but is not illustrated in more detail because it is well-known to those skilled in the related field.

In the positive electrode, an amount of the positive active material may be about 90 wt % to about 98 wt % based on the total weight of the positive active material layer.

In some example embodiments, the positive active material layer may further include a binder and a conductive material. The amounts of the binder and the conductive material may be about 1 wt % to about 5 wt %, respectively, based on a total weight of the positive active material layer.

The binder may serve to well attach the positive active material particles to each other and also to well attach the positive active material to the current collector. In an implementation, the binder may be, e.g., polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material may be used to impart conductivity to the electrode, and any material may be used as long as it does not cause chemical change in the battery to be configured and is an electron conductive material. In an implementation conductive material may include, e.g., a carbon-based material such as natural graphite, artificial graphite, carbon black, acetylene black, Ketjen black, a carbon fiber, and the like; a metal-based material of a metal powder or a metal fiber including copper, nickel, aluminum, silver, and the like; a conductive polymer such as a polyphenylene derivative; or a mixture thereof. The current collector may include Al.

The electrolyte solution may include a non-aqueous organic solvent and a lithium salt. The non-aqueous organic solvent may serve as a medium for transmitting ions taking part in the electrochemical reaction of a battery. The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropionate, ethylpropionate, decanolide, mevalonolactone, caprolactone, and the like. The ether-based solvent may include dibutyl ether, tetraglyme, diglyme, dimethoxyethane, 2-methyltetrahydrofuran, and the like. The ketone-based solvent may include cyclohexanone, and the like. The alcohol-based solvent may include ethanol, isopropyl alcohol, and the like and the aprotic solvent may include nitriles such as R—CN (where R may be a C2 to C20 linear, branched, or cyclic hydrocarbon, may include a double bond, an aromatic ring, or an ether bond), amides such as dimethylformamide, dioxolanes such as 1,3-dioxolane, sulfolanes, and the like.

The organic solvents may be used alone or in combination with one or more, and the mixing ratio if used in combination with one or more may be appropriately adjusted according to the desired battery performance, which can be widely understood by those skilled in the art.

If the non-aqueous organic solvents are mixed, a mixed solvent of a cyclic carbonate and a chain carbonate, a mixed solvent of a cyclic carbonate and a propionate-based solvent, or a mixed solvent of a cyclic carbonate, a chain carbonate, and a propionate-based solvent may be used. The propionate-based solvent may be methyl propionate, ethyl propionate, propyl propionate, or a combination thereof.

If the cyclic carbonate and chain carbonate or the cyclic carbonate and propionate-based solvent are mixed, a performance of the electrolyte solution may be improved if mixed in a volume ratio of about 1:1 to about 1:9. If the cyclic carbonate, chain carbonate, and propionate-based solvent are mixed, they may be mixed in a volume ratio of about 1:1:1 to about 3:3:4. The mixing ratio of the solvents may be appropriately adjusted according to desired physical properties.

The organic solvent may further include an aromatic hydrocarbon-based organic solvent in addition to the carbonate-based solvent. Herein, the carbonate-based solvent and the aromatic hydrocarbon-based organic solvent may be mixed in a volume ratio of about 1:1 to about 30:1.

The aromatic hydrocarbon-based organic solvent may be an aromatic hydrocarbon-based compound of Chemical Formula 1.

[Chemical Formula 1]

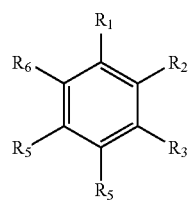

In Chemical Formula 1, $R_1$ to $R_6$ may be the same or different and may be, e.g., hydrogen, a halogen, a C1 to C10 alkyl group, a haloalkyl group, and a combination thereof.

In an implementation the aromatic hydrocarbon-based organic solvent may be, e.g., benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylethyl carbonate, vinylene carbonate or an ethylene carbonate-based compound of Chemical Formula 2 in order to improve a cycle-life of a battery as an additive.

[Chemical Formula 2]

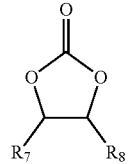

In Chemical Formula 2, $R_7$ and $R_8$ may be the same or different, and may be, e.g., hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, and $R_7$ and $R_8$ are not hydrogen.

In an implementation, the ethylene carbonate-based compound may include, e.g., difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving a cycle-life may be used within an appropriate range.

The lithium salt dissolved in an organic solvent may supply a battery with lithium ions, may basically operate the rechargeable lithium battery, and may improve transportation of the lithium ions between positive and negative electrodes. In an implementation, the lithium salt may include at least one supporting salt, e.g., $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$, wherein, x and y are natural numbers, e.g., an integer ranging from 1 to 20, lithium difluoro (bisoxolato)phosphate, LiCl, LiI, $LiB(C_2O_4)_2$ (lithium bis(oxalato) borate: LiBOB), and lithium difluoro (oxalato) borate (LiDFOB). A concentration of the lithium salt may range from about 0.1 M to about 2.0 M. If the lithium salt is included at the above concentration range, an electrolyte may have excellent performance and lithium ion mobility due to optimal electrolyte conductivity and viscosity.

The rechargeable lithium battery may further include a separator between the negative electrode and the positive electrode, depending on a type of the battery. In an implementation, a suitable separator material may include, e.g., polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The FIGURE is an exploded perspective view of a rechargeable lithium battery according to some example embodiments. The rechargeable lithium battery according to some example embodiments is illustrated as a prismatic battery and may include variously-shaped batteries such as a cylindrical battery, a pouch battery, and the like.

Referring to the FIGURE, a rechargeable lithium battery 100 according to some example embodiments includes an electrode assembly 40 manufactured by winding a separator 30 interposed between a positive electrode 10 and a negative electrode 20, and a case 50 housing the electrode assembly 40. An electrolyte solution may be impregnated in the positive electrode 10, the negative electrode 20, and the separator 30.

In the following examples and comparative examples, each amount of metal oxide and metal silicate is obtained by analyzing a weight of Mg in an ICP method (ICP equipment name: Agilent 5100/PerkinElmer AVIO 550Max, manufacture: PerkinElmer Inc.) and calculating an area ratio of a main peak (200) of MgO and a main peak (211) of $Mg_2SiO_4$ through an X ray analysis in an XRD method using $CuK\alpha$ rays.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

An ethanol solvent and silicon particles having a particle size of several micrometers were mixed in a weight ratio of 9:1, and a silicon nano-dispersion was prepared using a bead mill (Netzsch, Germany). To the silicon nano-dispersion, $Mg(NO_3)_2$ was added to prepare a mixed solution including silicon and Mg in a weight ratio of 98.3:1.7.

The mixed solution was spray-dried at 170° C., preparing a Si precursor.

The Si precursor was mixed with meso pitch in a weight ratio of 50:50, and this mixture was heat-treated at 900° C. under an $N_2$ atmosphere for 2 hours, preparing a negative active material. The negative active material included a silicon-carbon composite which included secondary particles as an agglomerated product of nano-silicon primary particles and a soft carbon coating layer formed on the agglomerated product surface and in addition, in which Mg oxide and $Mg_2SiO_4$ were located in the primary particles, the secondary particles, and the soft carbon coating layer. The soft carbon coating layer had a thickness of 30 nm.

In the prepared negative active material, an amount of the silicon-carbon composites was 97.9 wt % based on 100 wt % of the negative active material, an amount of Mg oxide was 1.5 wt % based on 100 wt % of the negative active material, and an amount of Mg silicate was 0.6 wt % based on 100 wt % of the negative active material. An amount of the silicon nanoparticles was 57.9 wt % based on 100 wt % of the negative active material, and an amount of the soft carbon amorphous carbon was 40 wt % based on 100 wt % of the negative active material.

If the prepared negative active material was used as a first negative active material, and artificial graphite was used as a second negative active material, 12.5 wt % of the first negative active material and 86 wt % of the second negative active material were mixed to prepare a mixed negative active material.

97.5 wt % of the mixed negative active material, 1 wt % of carboxymethyl cellulose, and 0.5 wt % of a styrene butadiene rubber were mixed in a water solvent, preparing negative active material layer slurry.

The negative active material layer slurry was coated on a Cu foil current collector and then, dried and compressed to form a negative active material layer, manufacturing a negative electrode.

The negative electrode, a lithium metal counter electrode, and an electrolyte were used to manufacture a half-cell. The negative electrode, a $LiCoO_2$ positive electrode, and the electrolyte were used to manufacture a coin full cell (CFC).

In the half-cell and the full cell, the electrolyte was prepared by dissolving 1 M $LiPF_6$ in a mixed solvent of ethylene carbonate and dimethyl carbonate (in a volume ratio of 3:7).

Example 2

A negative active material was prepared in the same manner as in Example 1 except that $Mg(NO_3)_2$ was added to the silicon nano-dispersion to prepare a mixed solution including silicon and Mg in a weight ratio of 91.7:8.3. In the prepared negative active material, an amount of a silicon-carbon composite was 90.6 wt % based on 100 wt % of the negative active material, an amount of Mg oxide was 6.8 wt % based on 100 wt % of the negative active material, and an amount of Mg silicate was 2.6 wt % based on 100 wt % of the negative active material. In the silicon-carbon composite, an amount of the silicon nanoparticles was 52.6 wt % based on 100 wt % of the negative active material, and an amount of the soft carbon amorphous carbon was 38 wt % based on 100 wt % of the negative active material.

The negative active material was used as a first negative active material in the same manner as in Example 1 to manufacture a negative electrode, a half-cell, and a coin full cell.

Example 3

A negative active material was prepared in the same manner as in Example 1 except that $Mg(NO_3)_2$ was added to the silicon nano-dispersion to prepare a mixed solution including silicon and Mg in a weight ratio of 83.4:16.6. In the prepared negative active material, an amount of a silicon-carbon composite was 82.7 wt % based on 100 wt % of the negative active material, an amount of Mg oxide was 12.5 wt % based on 100 wt % of the negative active material, and an amount of Mg silicate was 4.8 wt % based on 100 wt % of the negative active material. In the silicon-carbon composite, an amount of the silicon nanoparticles was 45.7 wt % based on 100 wt % of the negative active material, and an amount of the soft carbon amorphous carbon was 37 wt % based on 100 wt % of the negative active material. The negative active material was used as a first negative active material in the same manner as in Example 1 to manufacture a negative electrode, a half-cell, and a coin full cell.

Example 4

A negative active material was prepared in the same manner as in Example 1 except that $Mg(NO_3)_2$ was added to silicon nano-dispersion to prepare a mixed solution including silicon and Mg in a weight ratio of 99.7:0.3. In the prepared negative active material, an amount of a silicon-carbon composite was 99.5 wt % based on 100 wt % of the negative active material, an amount of Mg oxide was 0.27 wt % based on 100 wt % of the negative active material, and an amount of Mg silicate was 0.23 wt % based on 100 wt % of the negative active material. An amount of the silicon nanoparticles was 59.5 wt % based on 100 wt % of the negative active material, and an amount of the soft carbon amorphous carbon was 40 wt % based on 100 wt % of the negative active material.

The negative active material was used as a first negative active material in the same manner as in Example 1 to manufacture a negative electrode, a half-cell, and a coin full cell.

Example 5

A negative active material was prepared in the same manner as in Example 1 except that $Zn(NO_3)_4$ instead of $Mg(NO_3)_2$ was added to the silicon nano-dispersion to prepare a mixed solution including silicon and Zn in a weight ratio of 98.3:1.7. In the negative active material, an amount of a silicon-carbon composite was 98.8 wt % based on 100 wt % of the negative active material, an amount of the Zn oxide was 1.1 wt % based on 100 wt % of the negative active material, and an amount of Zn silicate was 0.1 wt % based on 100 wt % of the negative active material. An amount of the silicon nanoparticles was 58.8 wt % based on 100 wt % of the negative active material, and an amount of the soft carbon amorphous carbon was 40 wt % based on 100 wt % of the negative active material.

The negative active material was used as a first negative active material in the same manner as in Example 1 to manufacture a negative electrode, a half-cell, and a coin full cell.

Example 6

A negative active material was prepared in the same manner as in Example 1 except that $Al(NO_3)_3$ instead of $Mg(NO_3)_2$ was added to the silicon nano-dispersion to prepare a mixed solution including silicon and Zn in a weight ratio of 98.3:1.7. In the prepared negative active material, an amount of a silicon-carbon composite was 96.3 wt % based on 100 wt % of the negative active material, an amount of Al oxide was 3.3 wt % based on 100 wt % of the negative active material, and an amount of Al silicate was 0.4 wt % based on 100 wt % of the negative active material. An amount of the silicon nanoparticles was 56.3 wt % based on 100 wt % of the negative active material, and an amount of the soft carbon amorphous carbon was 40 wt % based on 100 wt % of the negative active material.

The negative active material was used as a first negative active material in the same manner as in Example 1 to manufacture a negative electrode, a half-cell, and a coin full cell.

Comparative Example 1

A negative electrode and a half-cell were manufactured in the same manner as in Example 1 except that the silicon-carbon composite of Example 1 was used as a first negative active material.

Comparative Example 2

An ethanol solvent and silicon particles having a particle size of several micrometers were mixed in a weight ratio of 9:1 by using a bead mill (Netzsch, Germany), preparing silicon nano-dispersion.

The silicon nano-dispersion was spray-dried at 170° C. by using a spray dryer to prepare a Si precursor.

The Si precursor and meso pitch were mixed in a weight ratio of 50:50, and the mixture was heat-treated at 900° C. for 2 hours under a $N_2$ atmosphere to prepare a silicon-carbon composite.

The silicon-carbon composite was mixed with MgO in a weight ratio of 98.4:1.6, and this mixture was heat-treated at 950° C. under a mixed atmosphere of Ar and $N_2$ (a volume ratio of 1:1) to prepare a negative active material.

In the prepared negative active material, an amount of the silicon-carbon composite was 98.4 wt % based on 100 wt % of the negative active material, and an amount of Mg oxide was 1.6 wt %. An amount of the silicon nanoparticles was 49.2 wt % based on 100 wt % of the negative active material, and an amount of the soft carbon amorphous carbon was 49.2 wt % based on 100 wt % of the negative active material.

The negative active material was used as a first negative active material in the same manner as Example 1 to manufacture a negative electrode and a half-cell.

Experimental Example 1) Efficiency Evaluation

A half-cell was manufactured in the same manner as in Example 1 except that a negative electrode was manufactured by mixing 97.5 wt % of a graphite negative active material, 1 wt % of carboxymethyl cellulose, and 0.5 wt % of a styrene butadiene rubber were mixed in a water solvent to prepare negative active material layer slurry. This half-cell as used as a reference cell.

The half-cells of Examples 1 to 6 and Comparative Examples 1 and 2 and the reference cell were once charged and discharged at 0.1 C and then, measured with respect to charge and discharge capacity. A ratio of the $1^{st}$ discharge capacity to the $1^{st}$ charge capacity was obtained as efficiency.

From each charge capacity and discharge capacity of the half-cells of Examples 1 to 6 and Comparative Examples 1 and 2, the charge and discharge capacity of the reference cell was subtracted, and the obtained charge capacity and discharge capacity was divided by a silicon amount (g) of in each negative active material, obtaining silicon conversion charge capacity and silicon conversion discharge capacity. A ratio of the silicon conversion discharge capacity to the silicon conversion charge capacity was obtained as conversion efficiency. The conversion efficiency results are shown as silicon conversion efficiency in Table 2.

(1) Initial efficiency: Each of the coin full cells of Examples 1 to 6 and Comparative Examples 1 and 2 was once charged and discharged at 0.1 C and evaluated with respect to initial charge and discharge efficiency. The results are shown in Table 1.

(2) Cycle-life characteristics: Each of the coin full cells of Examples 1 to 6 and Comparative Examples 1 and 2 was 300 times charged and discharged at 0.5 C at 25° C. A ratio of the $300^{th}$ discharge capacity to the 1st discharge capacity was calculated. The results are shown in Table 1.

TABLE 1

|  | Metal oxide (wt %) | Metal silicate (wt %) | Silicon conversion efficiency (%) | Initial charge and discharge efficiency (%) | Cycle-life characteristics (300 cycle) |
| --- | --- | --- | --- | --- | --- |
| Example 1 | Mg oxide (1.5) | Mg silicate (0.6) | 88.2 | 86.2 | 90.6 |
| Example 2 | Mg oxide (6.8) | Mg silicate (2.6) | 90.9 | 87.4 | 91.1 |
| Example 3 | Mg oxide (12.5) | Mg silicate (4.8) | 92.8 | 88.2 | 85.4 |
| Example 4 | Mg oxide (0.27) | Mg silicate (0.23) | 85.5 | 85.2 | 85.1 |
| Example 5 | Zn oxide (1.1) | Zn silicate (0.1) | 86.4 | 85.6 | 87.3 |
| Example 6 | Al oxide (3.3) | Al silicate (0.4) | 86.2 | 85.5 | 88.1 |
| Comparative Example 1 | X | X | 85.0 | 85.1 | 60.4 |
| Comparative Example 2 | Mg oxide 1.6 | X | 84.8 | 85.5 | 58.4 |

As shown in Table 1, the cells of Examples 1 to 6 including metal oxide and metal silicate, wherein the metal oxide was more included than the metal silicate, compared with the cell of Comparative Example 1 including neither the metal oxide nor the metal silicate and the cell of Comparative Example 2 including the metal oxide alone, exhibited excellent cycle-life characteristics.

By way of summation and review, although crystalline carbon such as graphite may be mainly used as a negative active material of a rechargeable lithium battery, a capacity of the graphite may be as low as 360 mAh/g, and thus research on a silicon-based active material having a capacity four times higher is being actively conducted.

The negative active material according to some example embodiments may provide a battery exhibiting excellent cycle-life characteristics and rate capability.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative active material, comprising:
a silicon-carbon composite including silicon and amorphous carbon;
a metal oxide; and
a metal silicate,
wherein:
an amount of the metal oxide is about 0.21 wt % to about 14 wt %, based on a total weight of the negative active material,
an amount of the metal silicate is about 0.1 wt % to about 7 wt % based on a total weight of the negative active material, and
an amount of the metal oxide is greater than an amount of the metal silicate.

2. The negative active material as claimed in claim 1, wherein the metal oxide is an oxide of Mg, Zn, Al, Fe, Ni, or a combination thereof.

3. The negative active material as claimed in claim 1, wherein the metal silicate is a silicate of Mg, Zn, Al, Fe, Ni, or a combination thereof.

4. The negative active material as claimed in claim 1, wherein the metal oxide is an Mg oxide.

5. The negative active material as claimed in claim 1, wherein the metal silicate is an Mg silicate.

6. The negative active material as claimed in claim 1, wherein an amount of the metal oxide is about 0.25 wt % to about 14 wt % based on a total weight of the negative active material.

7. The negative active material as claimed in claim 1, wherein the metal of the metal oxide and the metal silicate is the same.

8. The negative active material as claimed in claim 1, wherein the amorphous carbon is soft carbon or hard carbon, a mesophase pitch carbonized product, sintered cokes, or a combination thereof.

9. The negative active material as claimed in claim 1, wherein the silicon-carbon composite includes amorphous carbon coated on a surface of the silicon.

10. The negative active material of claim 1, wherein the silicon-carbon composite further includes crystalline carbon.

11. A rechargeable lithium battery, comprising:
a negative electrode including the negative active material of claim 1;
a positive electrode; and
an electrolyte.

12. The negative active material as claimed in claim 1, wherein the metal oxide is an oxide of Zn, Al, Fe, Ni, or a combination thereof.

* * * * *